United States Patent
Zhang et al.

(10) Patent No.: US 9,326,216 B1
(45) Date of Patent: *Apr. 26, 2016

(54) METHOD AND APPARATUS FOR PREDICTING A PHYSICAL LAYER PARAMETER OF A WIRELESS PACKET IN A WIRELESS NETWORK

(71) Applicant: Marvell International Ltd., Hamilton (BM)

(72) Inventors: Hongyuan Zhang, Sunnyvale, CA (US); Rohit U. Nabar, Sunnyvale, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 319 days.

This patent is subject to a terminal disclaimer.

(21) Appl. No.: 13/918,015

(22) Filed: Jun. 14, 2013

Related U.S. Application Data

(63) Continuation of application No. 13/310,524, filed on Dec. 2, 2011, now Pat. No. 8,467,391, which is a continuation of application No. 12/463,930, filed on May 11, 2009, now Pat. No. 8,072,980.

(60) Provisional application No. 61/053,529, filed on May 15, 2008.

(51) Int. Cl.
*H04W 40/00* (2009.01)
*H04L 12/701* (2013.01)

(52) U.S. Cl.
CPC ............... *H04W 40/00* (2013.01); *H04L 45/00* (2013.01)

(58) Field of Classification Search
None
See application file for complete search history.

(56) References Cited

U.S. PATENT DOCUMENTS

| | | |
|---|---|---|
| 6,961,777 B1 | 11/2005 | Hariharasubrahmanian |
| 7,130,306 B1 | 10/2006 | Loukas |
| 7,415,531 B2 | 8/2008 | Musoll |
| 7,693,097 B2 | 4/2010 | Hoekstra et al. |
| 2003/0123405 A1 | 7/2003 | del Prado et al. |
| 2009/0073974 A1 | 3/2009 | Musoll |
| 2009/0296614 A1 | 12/2009 | Tzannes et al. |

OTHER PUBLICATIONS

"Draft Supplement to IEEE Standard for Information Technology", Telecommunications and Information Exchange Between Systems—Local and Metropolitan Area Networks—Specific Requirements—Part 11: Wireless LAN Medium access Control (MAC) and Physical Layer (PHY) Specifications: Further Higher Data Rate Extension in the 2.4 GHz Band, IEEE P802.77g/D8.2, Apr. 2003, pp. 1-69.

"IEEE Standards", Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 2: Higher-Speed Physical Layer (PHY) Extension in the 2.4 GHz band—Corrigendum 1, IEEE, Nov. 7, 2001, 23 pgs.

"International Standard ISO/IEC", Information Technology—Telecommunications and Information Exchange Between Systems—Local and Metropolitan Area Networks—Specific Requirements, Part 11: Wireless LAN Medium Access Control (MAC) and Physical Layer (PHY) Specifications, IEEE, Aug. 20, 1999, 531 pgs.

Mujtaba, "TGn Sync Proposal Technical Specification", Agere Systems Inc., IEEE, May 2005, 131 pgs.

*Primary Examiner* — Hicham Foud

(57) ABSTRACT

Methods and apparatus for processing frames in wireless networks is disclosed. In one implementation, the apparatus includes an antenna configured to (i) receive a first data frame, wherein the first data frame includes a field that identifies a parameter associated with a second data frame, and (ii) subsequent to receiving the first data frame, receive the second data frame. In one implementation, the apparatus further includes a processing module configured to (i) process the first data frame to identify the parameter associated with the second data frame, and (ii) based on identifying the parameter associated with the second data frame, process the second data frame.

20 Claims, 10 Drawing Sheets

500c

| Predictor field 502 | Information conveyed | Action taken |
|---|---|---|
| 01 | Next frame from the same source address and to the same destination address | Device 3: Preserve physical layer settings and/or decode payload of next frame<br>Devices 2, 4 and 5: Preserve physical layer settings and/or refrain from decoding payload of next frame |
| 10 | Next frame from the same source address, but to different destination address | Devices 3: Preserve physical layer settings and/or refrain from decoding payload of the next frame<br>Devices 2, 4 and 5: Preserve physical layer settings and/or decode payload of the next frame |
| 11 | Next frame from a different source address | All devices: Reset physical layer settings and decode payload of the next frame |
| 00 | Next frame addresses unknwon | All devices: Reset physical layer settings and decode payload of the next frame |

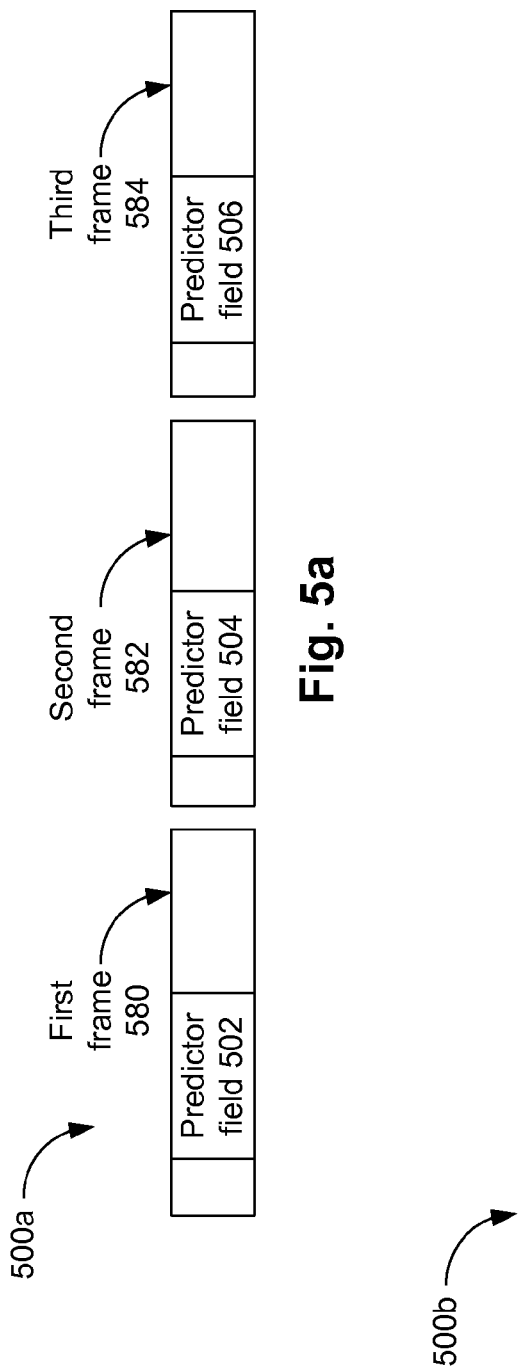

| Predictor field 502 | Information conveyed | Action taken |
|---|---|---|
| 01 | Next frame from the same source address and to the same destination address | Device 3: Preserve physical layer settings and/or decode payload of next frame<br>Devices 2, 4 and 5: Preserve physical layer settings and/or refrain from decoding payload of next frame |
| 10 | Next frame from the same source address, but to different destination address | Devices 3: Preserve physical layer settings and/or refrain from decoding payload of the next frame<br>Devices 2, 4 and 5: Preserve physical layer settings and/or decode payload of the next frame |
| 11 | Next frame from a different source address | All devices: Reset physical layer settings and decode payload of the next frame |
| 00 | Next frame addresses unknwon | All devices: Reset physical layer settings and decode payload of the next frame |

Fig. 5c

METHOD AND APPARATUS FOR PREDICTING A PHYSICAL LAYER PARAMETER OF A WIRELESS PACKET IN A WIRELESS NETWORK

CROSS REFERENCE TO RELATED APPLICATIONS

The present disclosure is a continuation of and claims priority to U.S. patent application Ser. No. 13/310,524, filed Dec. 2, 2011, now U.S. Pat. No. 8,467,391, issued Jun. 18, 2013, which is a continuation of U.S. patent application Ser. No. 12/463,930, filed May 11, 2009, now U.S. Pat. No. 8,072, 980, issued Dec. 6, 2011, which claims priority under 35 U.S.C. §119(e) to U.S. Patent Application No. 61/053,529, filed May 15, 2008, which are incorporated herein by reference.

TECHNICAL FIELD

The present disclosure relates to wireless networks, and more particularly, to frames in wireless networks.

BACKGROUND

Contention based multiple access is increasingly being used in various types of wireless networks. For example, a carrier sense multiple access (CSMA) protocol may use contention based multiple access. The CSMA protocol may be utilized for a wireless network, where a data packet is addressed or intended for a recipient, and where any other unintended recipient of the data packet in the wireless network stops transmission of its own data packets to reduce chances of collision. A medium access control (MAC) layer protection is usually used in a CSMA protocol, in which a device may reserve a time period for transmission, during which no other device within the network may transmit any data packet.

The CSMA protocol may be used in various types of wireless networks, including a wireless local area network employing, for example, Institute of Electrical and Electronics Engineers (IEEE) 802.11 protocols, e.g., IEEE 802.11b protocol released on 1999, IEEE 802.11g protocol released on 2003, IEEE 802.11n protocol expected to be released on 2009-2010, or any other appropriate IEEE 802.11 protocol. The CSMA protocol may also be used in other types of wireless networks, e.g., a wireless personal area network (WPAN), or the like.

FIG. 1 schematically illustrates an exemplary wireless network 100 including a plurality of wireless devices (e.g., device 1, . . . , device 5). The wireless network 100 may employ a CSMA protocol (e.g., any appropriate IEEE 802.11 protocol) to wirelessly communicate between the wireless devices 1, . . . , 5. Individual devices in the wireless network 100 transmit and/or receive data packets from one or more other devices in the network. For example, the wireless network 100 may be a wireless local area network (WLAN) employing an appropriate IEEE 802.11 protocol, and the device 1 may be an access point of the WLAN network. Devices 2, . . . , 5 may comprise computing devices (e.g., personal computers, laptops, etc.) that communicates with the access point of the network. Although only 5 wireless devices are illustrated in FIG. 1, any number of wireless devices may be included in the wireless network 100.

FIG. 2a illustrates an exemplary frame 200 transmitted by a wireless device (e.g., any of the wireless devices illustrated in FIG. 1). The frame 200 includes a preamble field 204, a signal field 210 (identified as Sig 210 in FIG. 2a), and a payload field 216. The preamble field 204 is used to indicate a start of the frame, and includes information that may be used by a recipient of the frame to perform a frequency and/or timing synchronization, automatic gain control (AGC), channel estimation, and/or the like.

The signal field 210 acts as a physical header for the frame, and includes one or more physical layer parameters of the frame. For example, the signal field 210 may include a modulation and/or coding scheme of the frame, a length of the payload, channel estimation information, and/or the like. The payload field 216 includes data, which may be modulated using one or more parameters indicated in the signal field 210. The payload field 216 may comprise a data packet.

Several other types of frame formats (e.g., non-high throughput (HT) format, HT mixed format, HT Greenfield format) may also used in a CSMA protocol (e.g., IEEE 802.11n protocol), as is known to those skilled in the art. For example, FIG. 2b illustrates an exemplary frame 200b, utilizing a non-high throughput format. The frame 200b may be used in a wireless network that utilizes, for example, IEEE 802.11n protocol. Similar to the frame 200, the frame 200b includes a payload field 216 and a signal field 210. The frame 200b also includes a preamble field comprising of a legacy short training field (L-STF) 220a and a legacy long training field (L-LTF) 220b.

Referring again to FIG. 1, device 1 transmits a frame (e.g., frame 200 or 200a) addressed to, for example, device 3. Device 3 (i.e., the intended recipient), along with one or more of the other devices (e.g., devices 2, 4 and/or 5) in the network 100, receives the frame. That is, although a frame may be addressed to an intended device, one or more other devices in the network may also receive the frame.

Upon receiving a frame, a device (e.g., device 3) may not immediately know if the device is an intended recipient of the frame (e.g., if a destination address in the frame is the same or different from the device address). A destination address of the current frame may be included in a MAC header in the payload field 216.

Device 3, upon receiving the frame, extracts synchronization information, automatic gain control settings, and/or channel estimation information from the preamble field 204 of the frame. Device 3 also updates one or more physical parameter settings (e.g., synchronization parameters, automatic gain control parameters, channel estimation parameters, etc.) based on the extracted information from the preamble field 204 of the current frame. Device 3 decodes the signal field 210 to extract one or more physical layer parameters (e.g., length) of the frame. Once device 3 identifies a length of the frame (and the corresponding time needed to transmit the entire frame), device 3 generally does not transmit any of its own frames (e.g., to avoid chances of collision with the current frame).

Upon decoding the physical layer parameters, device 3 transmits these parameters, including a MAC header, to the MAC layer. The MAC layer of device 3 detect the destination address (e.g., included in the MAC header) of the frame. If device 3 determines that device 3 is the intended recipient of the frame (e.g., the destination address of the frame matches the address of device 3), device 3 further processes the payload data in the frame. Otherwise (e.g., if device 3 detects that it is not the intended recipient), device 3 disregards the frame and/or stops further processing of the data in the frame.

Two consecutive frames that are from the same source (e.g., the same transmitter) generally have one or more similar physical layer parameter (e.g., similar channel estimations).

However, even if two consecutive frames (e.g., a first and second frame) are from the same source, a device may not know that the second frame has the same source address as the first frame until the device has already decoded one or more physical layer parameters from the second frame, and passed the decoded parameters to the MAC layer. Accordingly, each time a device receives a frame, the device generally needs to decode the one or more physical layer parameters from the frame, update its physical layer parameter settings, decode and transmit the MAC header (by decoding the payload field) to the MAC layer, and subsequently, the MAC layer determines the source and destination addresses of the frame. And if the frame is not addressed to the device, the device discards the physical layer parameter settings and stops further processing of the frame.

FIG. 3 schematically illustrates an exemplary receiver system 300 included in one of the devices (e.g., device 3) in the wireless network 100 of FIG. 1. The receiver system 300 includes two antennas 304a and 304b configured to transmit and/or receive wireless packets and frames to and/or from other wireless devices in the wireless network 100. Antennas 304a and 304b are operatively coupled to respective carrier sense and synchronization modules 308a and 308b. The respective carrier sense and synchronization modules 308a and 308b are also operatively coupled to channel estimation modules 312a and 312b, respectively. The channel estimation modules 312a and 312b are operatively coupled to a signal and payload demodulation/decoding module 320. The carrier sense and synchronization modules 308a and 308b are also coupled to a joint carrier sense (CS), synchronization, and AGC module 316. Also illustrated in FIG. 3 is a frame 324, which may be similar to the frame 200b of FIG. 2b, and which includes a preamble field (including legacy short training field (L-STF) 220a and legacy long training field (L-LTF) 220b), signal field 210 and a payload field 216.

In operation, the two antennas 304a and 304b receive a frame (e.g., frame 324), and the carrier sense and synchronization modules 308a and 308b extract frame and time synchronization information and a start of the frame indication from the preamble fields (e.g., L-STF field 220a and L-LTF field 220b) of the frame 324. The joint CS, synchronization, and AGC module 316 uses the extracted information from the carrier sense and synchronization modules 308a and 308b to provide a joint carrier sense, carrier synchronization and/or automatic gain control for the receiver system 300. The joint CS, synchronization, and AGC module 316, thus, combines information received from both the antennas 304 and 304b to achieve a relatively better performance. The channel estimation modules 312a and 312b perform channel estimation of the frame 324 (using, for example, information in L-LTF field 220b), and output the frame to signal and payload demodulation/decoding module 320 for further processing (e.g., demodulating and/or decoding the signal field 210 and/or the payload field 216).

The joint CS, synchronization, and AGC module 316 uses extracted information from carrier sense and synchronization modules 308a and 308b, thereby at least partially gaining from the antenna diversity or redundancy. However, the joint CS, synchronization, and AGC module 316 may not be able to fully exploit the advantages offered by multiple antenna diversity. This is because the joint CS, synchronization, and AGC module 316 may not have channel estimations of the receive frame.

In summary, as discussed with respect to FIG. 2a, until a device decodes the payload field 216 of a received frame and transmits the MAC header included in the payload field to the MAC layer of the device, the device may not know if the device is an intended recipient of the frame. Moreover, each time a device receives a frame, the device needs to extract one or more physical layer parameters from the frame and update the device's physical layer parameter settings. However, if the device is not the intended recipient of the frame, the device discards most of the decoded data and stops further processing of the frame. This generally results in waste of device resources, for example, device power. Also, as discussed with respect to FIG. 3, in a multi-antenna system, as the module 316 does not have access to channel estimation of a received frame, the module 316 may not be able to fully exploit advantages of multiple antenna diversity.

SUMMARY

In various embodiments, the present disclosure provides a method comprising, prior to a transmission of a first frame, predicting a source address and a destination address of a second frame that is to be transmitted subsequent to the transmission of the first frame, generating a predictor field, where the predictor field includes information associated with the predicted source address and the predicted destination address of the second frame, and appending the predictor field in the first frame. The method further comprises a first wireless device transmitting the first frame.

In various embodiments, the present disclosure provides a method comprising a first wireless device receiving a first frame including a predictor field, where the predictor field includes information associated with a source address and a destination address of a second frame that is to be received by the first wireless device subsequent to receiving the first frame, and, based at least in part on the received predictor field, conditionally preserving one or more physical layer settings of the first wireless device based on the first frame.

In various embodiments, the present disclosure provides a method comprising a first wireless device receiving a first frame including a predictor field, where the predictor field includes information associated with a second frame, and determining, from the predictor field, that a destination address of the second frame is different from an address of the first wireless device. The method further comprises the first wireless device receiving the second frame immediately subsequent to receiving the first frame and, based at least in part on said determining, the first wireless device refraining from decoding at least a part of a payload of the second frame.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 5a illustrates a series of frames transmitted by one or more devices of the wireless network of FIG. 1.

FIG. 5b illustrates a table that includes exemplary information conveyed by a one bit predictor field of FIG. 5a, and associated actions taken by one or more devices of the wireless network of FIG. 1.

FIG. 5c illustrates a table that includes exemplary information conveyed by a two bit predictor field of FIG. 5a, and associated actions taken by one or more devices of the wireless network of FIG. 1.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
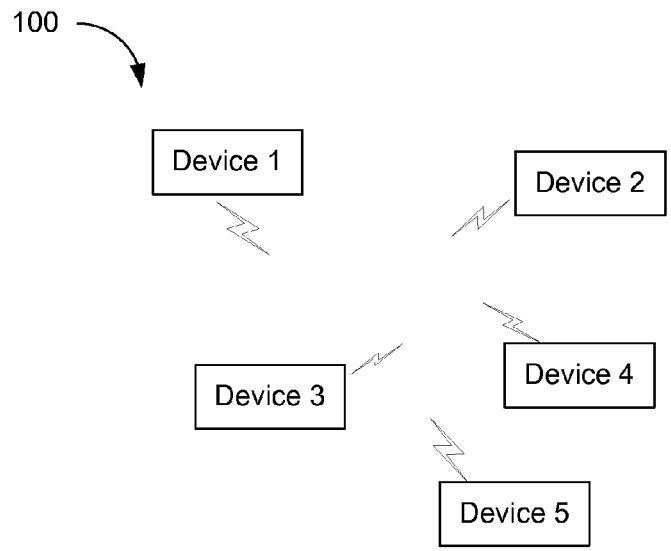
FIG. 1 schematically illustrates an exemplary wireless network including a plurality of wireless devices.
Figure 2A:
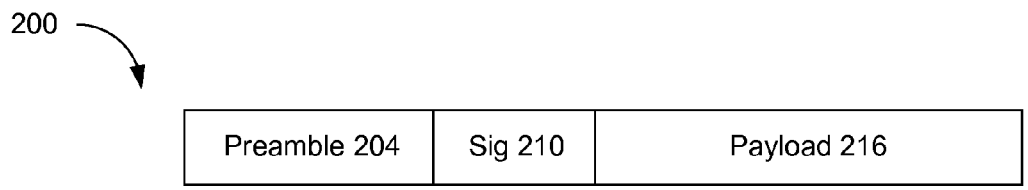
FIG. 2a-2b illustrates an exemplary frame transmitted by a wireless device.
Figure 2B:
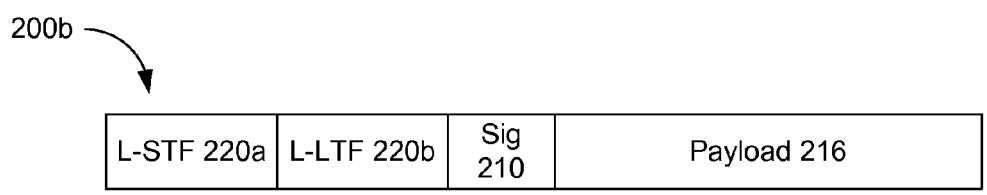
Figure 4A:
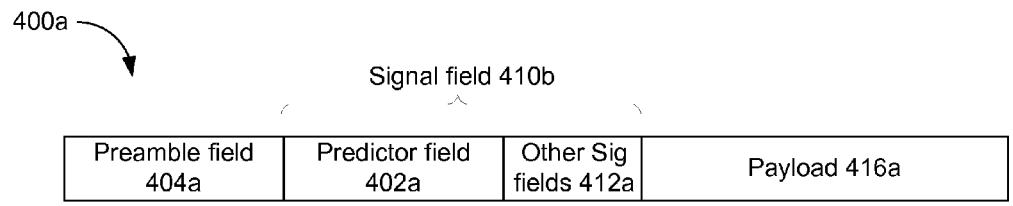
FIGS. 4a-4d illustrate exemplary frames transmitted by one or more wireless devices.

FIG. 4a illustrates an exemplary frame 400a transmitted by a wireless device (e.g., device 1 of the wireless network 100 of FIG. 1). The frame 400a includes a preamble field 404a, signal fields 410a and payload field 416a. In one embodiment, the signal field includes a predictor field 402a and other signal fields 412a. The other signal fields 412a may be, for example, similar to the signal field 210 of FIG. 2a. In one embodiment, the predictor field 402a includes information about one or more frames to be transmitted subsequent to the frame 400a, as will be discussed in more details herein later.

Figure 4B:
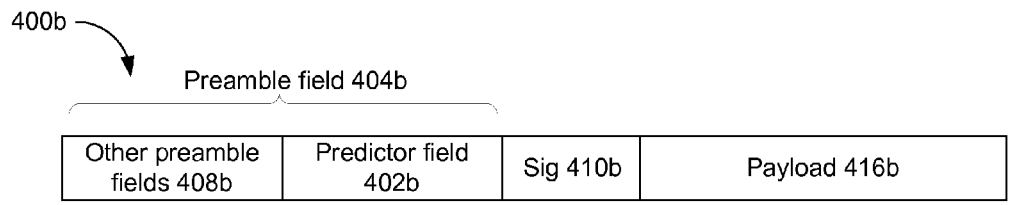

Although the predictor field 402a in FIG. 4a is illustrated to be a part of the signal fields 410a, the predictor field may be a part of a preamble field. For example, FIG. 4b illustrates an exemplary frame 400b transmitted by a wireless device, where the frame 400b includes a predictor field 402b that is part of a preamble field 404b.

Figure 4C:

In one embodiment, the predictor field 402 is appended between two fields of a preamble field. For example, FIG. 4c illustrates an exemplary frame 400c transmitted by a wireless device, where the frame 400c includes a predictor field 402c that is part of a preamble field 404c. The predictor field 402c may be appended between two fields (e.g., L-STF 422c and L-LTF 424c) of the preamble field 404c.

Figure 4D:
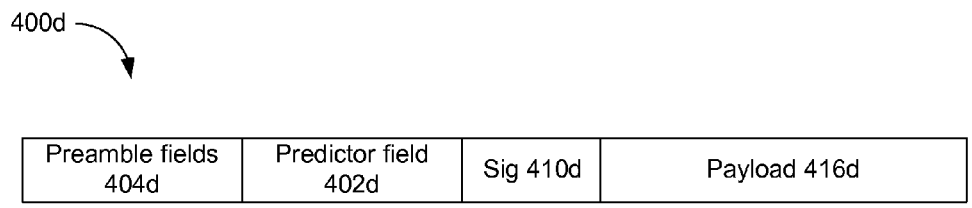

In one embodiment, a predictor field is separate from a preamble field and/or a signal field. For example, FIG. 4d illustrates an exemplary frame 400d transmitted by a wireless device, where the frame 400d includes a predictor field 402d that is appended between a preamble field 404d and a signal field 410d.

Other configurations of the predictor field may also be implemented. For example, the predictor field may be partitioned in two or more segments, with one or more segments of the predictor field included in the preamble field of a frame, and remaining one or more segments of the predictor field included in the signal field of the frame.

FIG. 5a illustrates a series of frames 500a transmitted by one or more devices of the wireless network 100 of FIG. 1. The series of frames 500a includes at least a first frame 580, a second frame 582, and a third frame 584. Each of the first frame 580, second frame 582, and third frame 584 may include one or more fields (e.g., as discussed with respect to FIGS. 2a, 2b, and 4a-4d), including predictor fields 502, 504 and 506, respectively.

In one embodiment, the first frame 580 and the second frame 582 are "consecutive frames" of the wireless network 100. That is, there may not be any intermediate frame, transmitted by any device included in the wireless network 100, which may be transmitted between the first frame 580 and the second frame 582. Thus, the second frame 582 may be the "immediate next" or "immediate subsequent" frame of the first frame 580. For example, device 1 may transmit the first frame 580 addressed to device 3 of the wireless network 100, and device 4 may transmit the second frame 582 addressed to device 2 of the wireless network 100, and no other device associated with the wireless network 100 (e.g., no other in-band device of the wireless network 100) may transmit any frame in between the first frame 580 and the second frame 582. Similarly, the second frame 582 and the third frame 584 may also be two consecutive frames of the wireless network 100.

FIG. 5b illustrates a table 500b that includes exemplary information conveyed by a one bit predictor field 502 of FIG. 5a, and associated actions taken by one or more devices of the wireless network 100 of FIG. 1. Individual rows of the table 500b include a status of the predictor field 500, corresponding information conveyed, and corresponding action taken.

Referring to FIGS. 5a and 5b, in an example scenario, the first frame 580 is transmitted by device 1 of the wireless network 100 of FIG. 1, and is addressed to device 3 (i.e., the device 3 may be an intended recipient of the first frame 580). Thus, a source address of the first frame 580 is the address of device 1, whereas a destination address of the first frame is the address of device 3. Although the first frame 580 is addressed to device 3, one or more other devices (e.g., devices 2, 4 and/or 5) in the wireless network 100 may also receive the first frame 580. In one embodiment, device 1 is able to predict, before transmitting the first frame 580, a source address of the second frame 582 that is to be transmitted immediately subsequent to the first frame. At the least, device 1 is able to predict, before transmitting the first frame 580, whether or not device 1 is going to transmit the second frame 582.

Also, in the case where device 1 is going to transmit the second frame 582, device 1 is also able to predict, before transmitting the first frame 580, a destination address of the second frame 582. Using these predictions, device 1 generates the prediction field 502, and includes the prediction field 502 in the first frame 580 before transmitting the first frame.

Referring again to FIG. 5b, a value of 1 in the predictor field 502 may imply that the immediate next frame (e.g., the second frame 582) has a source address and a destination address that are the same as the source address and destination address of the first frame 580. A value of 0 in the predictor field 502 may imply otherwise (e.g., the immediate next frame is to be transmitted from a different source address or addressed to a different destination address).

Thus, upon receiving a predictor bit of 1 in the first frame 580, device 3 is aware that the second frame 582 is from device 1 and is addressed to device 3. Thus, the device 3 is aware that one or more physical layer settings (e.g., frequency synchronization, time synchronization, channel estimation, and/or the like) extracted from the first frame will be the same as the one or more physical layer settings to be extracted from the second frame (because the two frames has the same source address). Accordingly, upon receiving the predictor bit 1 in the first frame 580, device 3 preserves the one or more physical layer settings extracted from the first frame, to re-use the same settings while receiving, decoding and/or processing the second frame 582. Thus, device 3 need not extract the same settings from the second frame, and/or may use one or more settings from the first frame to at least partially process the second frame. Additionally, the device 3 decodes the payload of the second frame 582, as the device 3 may be certain that the second frame is addressed to itself.

Other devices (e.g., devices 2, 4 and/or 5) in the wireless network 100 may also receive the predictor field 502 with a value of 1, and may be aware that the second frame 582 is from device 1 and is addressed to device 3. As the source address of both the first and second frame is predicted to be the same, upon receiving the predictor bit 1 in the first frame 580, devices 2, 4 and/or 5 also preserve the one or more physical layer settings from the first frame, to re-use the same while receiving, decoding and/or processing the second frame 582. Additionally, devices 2, 4 and/or 5 are aware that the second frame is addressed to a different device. Hence, devices 2, 4 and/or 5 abstain or refrain from decoding the payload (or at least a part of the payload) field of the second frame 582.

Upon receiving a value 0 in the predictor field 520 of the first frame 580, all devices in the wireless network 100 resets the one or more physical layer settings before receiving, decoding and/or processing the second frame 582 (similar to a conventional wireless device), extract afresh the one or more physical layer settings from the second frame 582, and decode the payload of the second frame 582.

FIG. 5c illustrates a table 500c that includes exemplary information conveyed by a two bit predictor field 502 of FIG. 5a, and associated actions taken by one or more devices of the wireless network 100 of FIG. 1. The table 500c pertains to an exemplary situation where the first frame 580 is transmitted by device 1 and the intended recipient is device 3.

In one embodiment, a value of "01" in the predictor field 502 implies, for example, that the immediate next frame (e.g., the second frame 582) has a source address and a destination address that are the same as the source address and destination address of the first frame 580. This case is similar to the first row of table 500b, and accordingly, device 3 preserves one or more physical settings from the first frame 580 to the second frame 582, and/or decodes the payload of the second frame 582. Also, devices 2, 4 and/or 5 preserve one or more physical settings from the first frame 580 to the second frame 582, and/or abstain or refrain from decoding the payload (or at least a part of the payload) field of the second frame 582.

In one embodiment, a value of "10" in the predictor field 502 implies that the next frame has a source address that is the same as the source address of the first field 580, but has a destination address that is different from the destination address of the first field 580. As the source addresses of both the frames are the same, devices 2, 3, 4 and/or 5 preserve one or more physical settings from the first frame 580 and apply the same to the second frame 582. Additionally, the second frame 582 may be addressed to any device, except device 3 (as the destination address of the second frame 582 is different from that of the first frame 580). Accordingly, devices 2, 4 and 5 decode the payload of the second frame 582 (as these devices are unsure of the intended recipient of the second frame 582). Device 3, upon knowing that the second frame 582 is not addressed to itself, abstains or refrains from decoding the payload of the second frame 582.

In one embodiment, a value of "11" in the predictor field 502 implies that the immediate next frame has a source address that is different from the source address of the first field 580. A value of 00 in the predictor field 502 may imply that the source and/or destination addresses of the immediate next frame are unknown. In each of these cases (e.g., predictor field values of 11 and 00), the devices in the network are not able to predict the source and/or destination address of the immediate next frame. Accordingly, in each of these cases, all the devices reset respective physical layer settings prior to receiving and/or decoding the second frame 582, and decode the payload of the second frame 582.

In various embodiments, it may be possible to add additional bits in the predictor field to convey more information about a plurality of immediate subsequent frames. For example, a predictor field may include information that predicts that immediate subsequent N (where N≥1) number of frames is from the same source and/or addressed to the same destination. The number of additional bits required in the predictor field to include this information may be based at least in part on a maximum desired value of N.

For example, the predictor field 502 of FIG. 5a may include information that indicates that both the second and third frames 582 and 582 have source addresses and destination addresses that are the same as those in the first frame 580 (similar to the first row of table 500c). Accordingly, similar to the action taken in FIG. 5c, in this case, devices 2, 4 and/or 5 preserve one or more physical settings from the first frame 580 and apply the same while receiving, decoding and/or processing the second and/or third frames 582 and 584, and/or abstain or refrain from decoding the payload (or at least a part of the payload) field of the second and third frames 582 and 584. Additionally, device 3 decodes the payload of the second and third frames 580 and 584.

In various embodiments, it may be possible to add additional bits in the predictor field to indicate a length of one or more immediate next frames. For example, a predictor field may indicate that both the second and third frames 582 and 584 have source addresses and destination addresses that are the same as the source address and destination address of the first frame 580. Additionally, the predictor field may also indicate the length of the second and/or the third frames 582 and 584. In various embodiments, the devices 2, . . . , 5 may hold their transmission for the time the second and third frames 580 and 582 are being transmitted by device 1 to device 3.

Additionally, devices 2, 4 and/or 5 may completely (or at least partially) suspend one or more operations (e.g., transmission/reception operation by entering, for example, in an idle or sleep mode to save power) during the time the second and third frames 582 and 584 are being transmitted by device 1 to device 3. From the length of the second and third frames 580 and 582, devices 2, 4 and 5 may be aware of the maximum time duration for which these devices may remain idle.

In various embodiments, it may be possible to add additional bits in the predictor frame to indicate the actual source and/or the actual destination addresses of one or more immediate next frames. For example, individual devices in the wireless network 100 may be assigned a respective identification (ID) number, and the ID numbers of the source and destination devices of one or more immediate next frames may be included in the predictor field. Including the source address in the predictor field have various advantages. For example, the predictor field 502 of the first frame 580 may include a source address of the second frame 582. After receiving the first frame (or along with receiving the first frame), one or more devices of the wireless network 100 may receive a frame (e.g., a fourth frame) that is different from the second frame. That is, although the second frame was predicted to be transmitted immediately next to transmission of the first frame, a different frame was actually transmitted by a device (e.g., due to collision or interference). The one or more devices identifies that the source address of the received fourth frame is different from the expected source address of the second frame. Accordingly, the one or more devices switches back to conventional receiving (e.g., reset all the physical layer settings and/or fully decode the fourth frame), without further using the information included in the predictor field of the first frame 580.

Using a predictor field in various embodiments of the present disclosure may have one or more advantages. For example, as discussed, it may be possible to preserve one or more physical layer settings of the current frame (e.g., whenever the immediate next frame has the same source address as the current frame) to use in reception, decoding and/or processing of the immediate next frame. This may facilitate synchronization and/or decoding of the immediate next frame relative easily and with relatively better accuracy (e.g., resulting in better signal to noise ratio). For example, a carrier frequency offset (CFO) estimation of a current frame may be used to initialize a CFO estimation and/or tracking for the immediate next frame, resulting in improved CFO compensation for the immediate next frame. Preserving the physical layer settings may also save power of the devices that were to be spent towards resetting, initializing and/or extracting the one or more physical layer settings from the next frame. Additionally, if a device is aware that the immediate next frame is not addressed to the device, the device may not decode at least a part of the payload of the next frame. A device may also remain idle if the device is aware that the next one or more frames are not addressed to the device, thereby saving power of the device.

Figure 3:
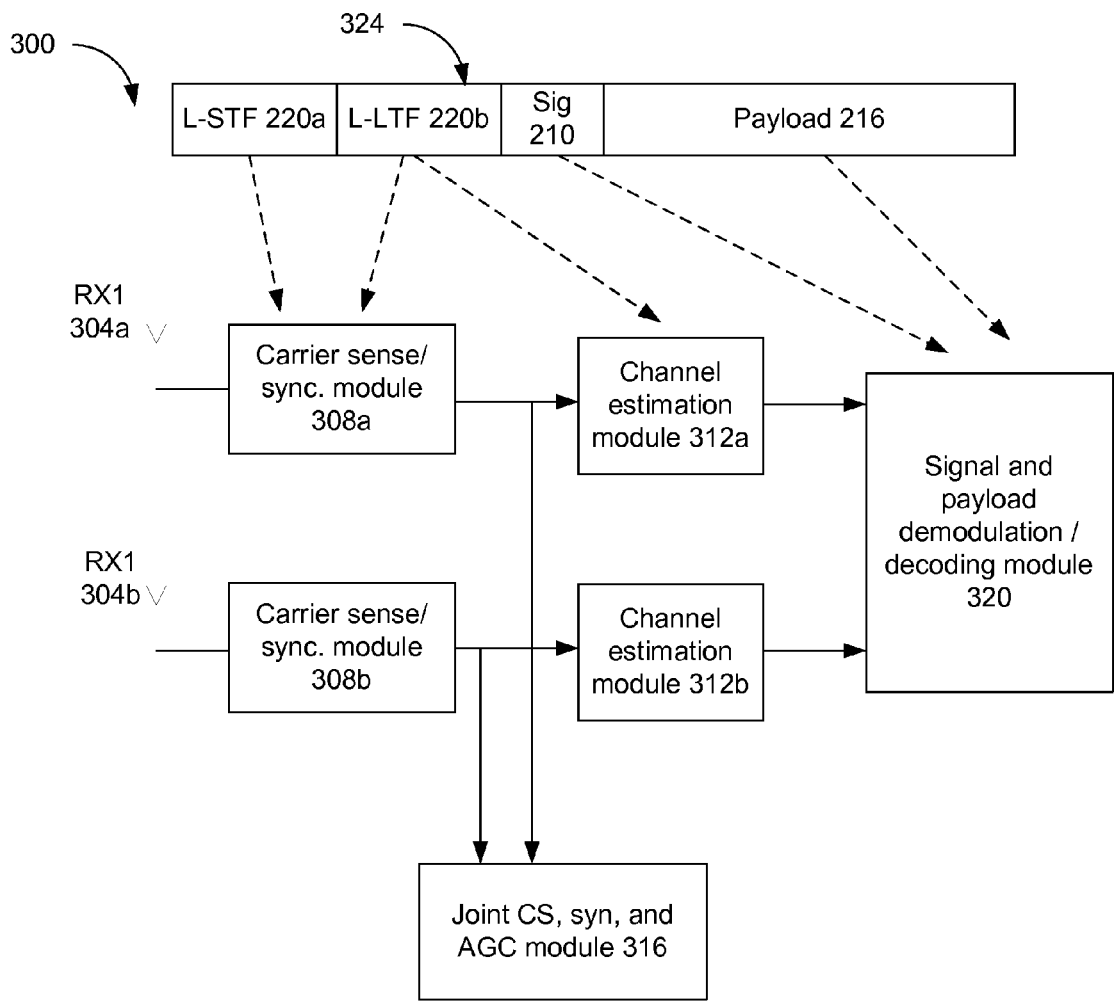
FIG. 3 schematically illustrates an exemplary receiver system included in one of the devices in the wireless network of FIG. 1.
Figure 6:
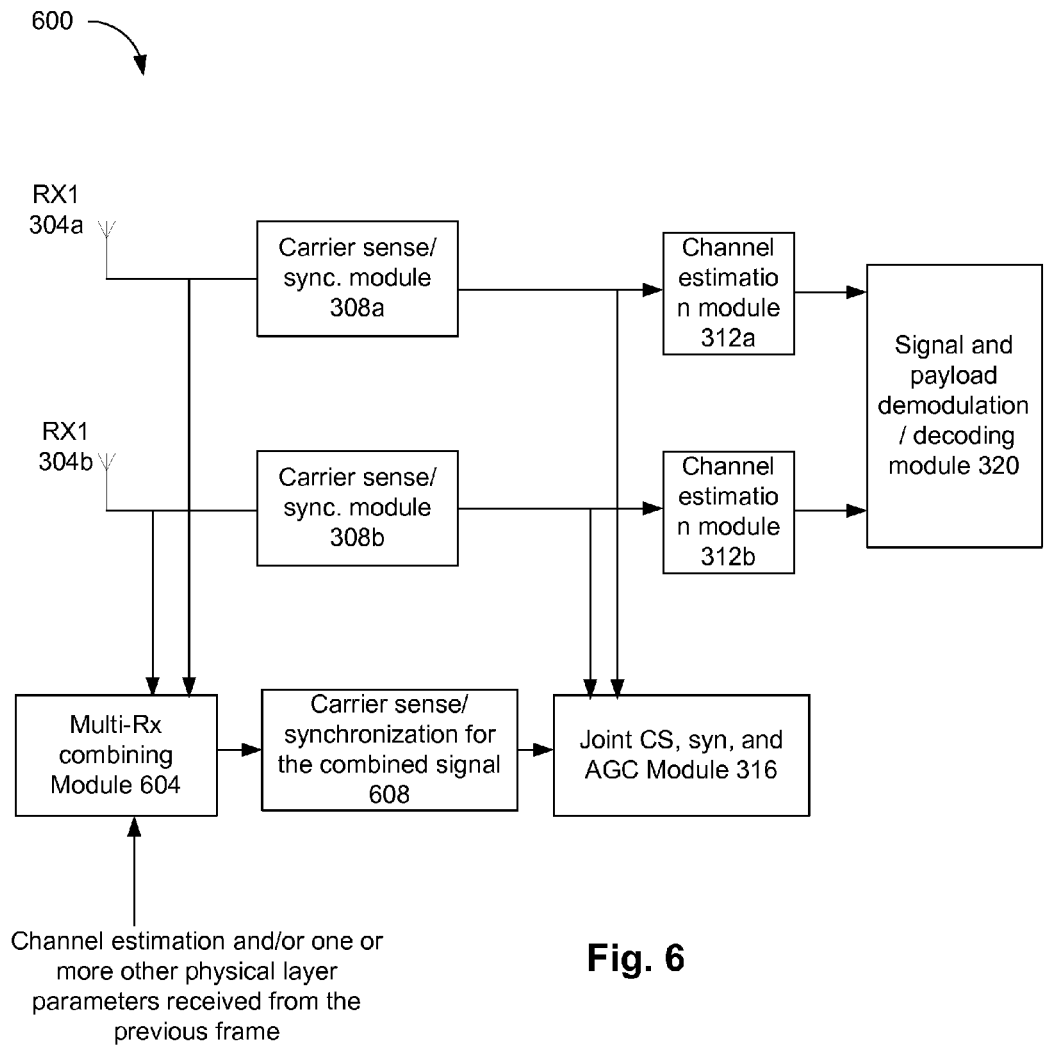
FIG. 6 schematically illustrates an exemplary receiver system included in one of the devices in the wireless network of FIG. 1.

FIG. 6 schematically illustrates an exemplary receiver system 600 included in one of the devices (e.g., device 3) in the wireless network 100 of FIG. 1. One or more components of FIG. 6 may be at least in part similar to respective components in FIG. 3. In addition, the system 600 includes a multi-antenna combining module 604 operatively coupled to the two antennas 304*a* and 304*b*. The multi-antenna combining module 604 is operatively coupled to the joint carrier sense (CS), synchronization, and AGC module 316 through a carrier sense/synchronization module 608 that performs carrier sense and/or synchronization of the combined signals of the two antennas.

In one embodiment, if the source addresses of the current and previous frame are the same, the predictor field in the previous frame predicts such similarity. Based on such prediction, the receiver system 600 uses one or more physical layer parameters of the previous frame in processing the current frame. In various embodiments, while processing a current frame, the multi-antenna combining module 604 receives channel estimation and/or one or more other physical layer parameters decoded from an immediate previous frame, using which the multi-antenna combining module 604 performs a coherent combining of the current frame received over the two antennas. The channel estimation from the previous frame is used by the carrier sense and synchronization module 608 for carrier sense and/or synchronization of the combined signals. Thus, the joint carrier sense (CS), synchronization, and AGC module 316 has access to the channel estimation, carrier sense and/or synchronization parameters of the combined signals, and is able to better exploit the advantages offered by multi-antenna diversity.

Figure 7:
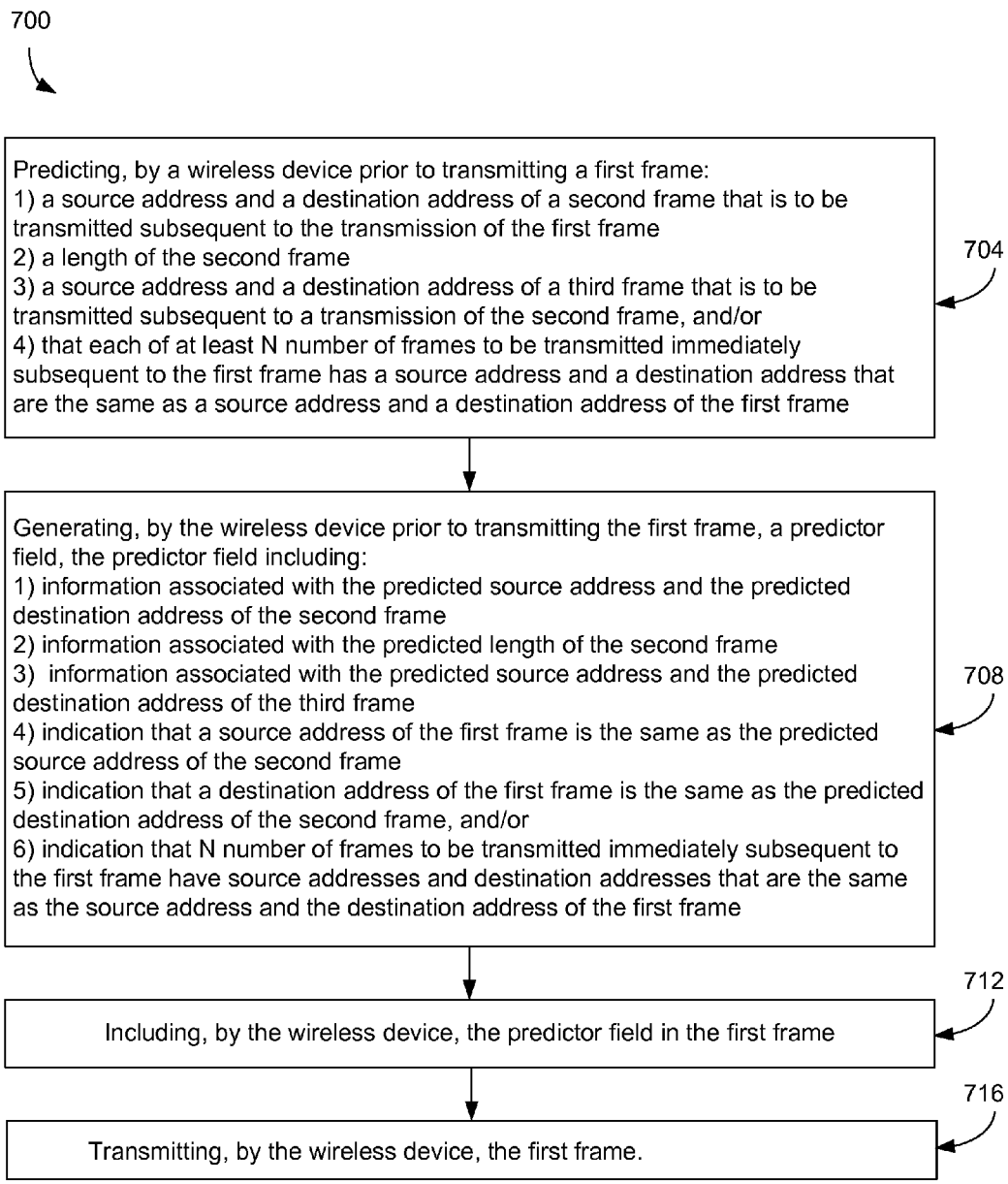
FIG. 7 illustrates an exemplary method for transmitting a frame that includes a predictor field.

FIG. 7 illustrates an exemplary method 700 for transmitting a frame that includes a predictor field. The method 700 includes, at block 704, predicting by a wireless device (e.g., device 1 of FIG. 1) prior to transmitting a first frame (e.g., first frame 580 FIG. 5*a*); 1) a source address and a destination address of a second frame (e.g., second frame 582 FIG. 5*a*) that is to be transmitted subsequent to the transmission of the first frame; 2) a length of the second frame; 3) a source address and a destination address of a third frame that is to be transmitted subsequent to a transmission of the second frame; and/or 4) that each of at least N number of frames to be transmitted immediately subsequent to the first frame has a source address and a destination address that are the same as a source address and a destination address of the first frame. In one embodiment, N is a number greater than or equal to zero.

The method 700 further includes, at block 708, generating, by the wireless device prior to transmitting the first frame, a predictor field (e.g., predictor field 502 of FIG. 5*a*), the predictor field including: 1) information associated with the predicted source address and the predicted destination address of the second frame; 2) information associated with the predicted length of the second frame; 3) information associated with the predicted source address and the predicted destination address of the third frame; 4) indication that a source address of the first frame is the same as the predicted source address of the second frame; 5) indication that a destination address of the first frame is the same as the predicted destination address of the second frame; and/or 6) indication that N number of frames to be transmitted immediately subsequent to the first frame have source addresses and destination addresses that are the same as the source address and the destination address of the first frame.

The method 700 further includes, at block 712, including, by the wireless device, the predictor field in the first frame. The method 700 further includes, at block 716, transmitting, by the wireless device, the first frame to one or more devices in the wireless network 100.

Figure 8A:
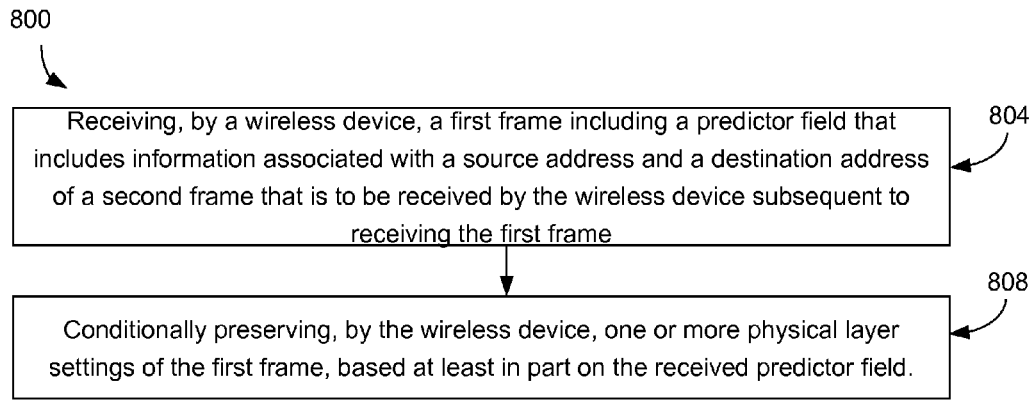
FIGS. 8a-8c illustrate exemplary methods for receiving one or more frames, including associated predictor fields.

FIG. 8*a* illustrates an exemplary method 800 for receiving a frame that includes a predictor field. The method 800 includes, at block 804, receiving, by a wireless device (e.g., device 1 of FIG. 1), a first frame (e.g., first frame 580 FIG. 5*a*) including a predictor field (e.g., predictor field 502 of FIG. 5*a*) that includes information associated with a source address and a destination address of a second frame (e.g., second frame 582 FIG. 5*a*) that is to be received by the wireless device subsequent to receiving the first frame.

The method 800 further includes, at block 808, conditionally preserving, by the wireless device, one or more physical layer settings of the first frame, based at least in part on the received predictor field. For example, the wireless device may determine, from the predictor field, that the source address of the second frame is the same as a source address of the first frame. Based on such determination, the wireless device may preserve the one or more physical layer settings of the first frame. Although not illustrated in FIG. 8*a*, the method may further include, receiving, by the wireless device, the second frame immediately subsequent to receiving the first frame, and using the preserved one or more physical layer settings of the first frame to process the second frame. For example, the wireless device may use the preserved one or more physical layer settings of the first frame for conducting carrier sensing, frequency synchronization, time synchronization, decoding, and/or payload detection of the second frame.

Figure 8B:
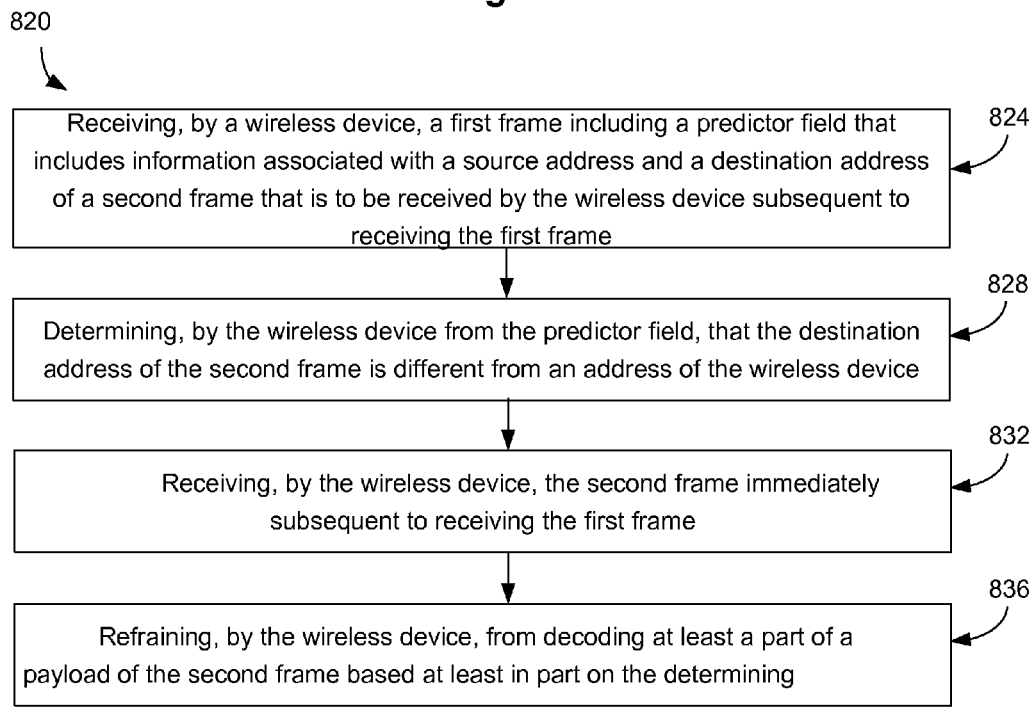

FIG. 8*b* illustrates an exemplary method 820 for receiving a frame that includes a predictor field. The method 820 includes, at block 824, receiving, by a wireless device (e.g., device 1 of FIG. 1), a first frame (e.g., first frame 580 FIG. 5*a*) including a predictor field (e.g., predictor field 502 of FIG. 5*a*) that includes information associated with a source address and a destination address of a second frame (e.g., second frame 582 FIG. 5*a*) that is to be received by the wireless device subsequent to receiving the first frame. The method 820 further includes, at block 828, determining, by the wireless device from the predictor field, that the destination address of the second frame is different from an address of the wireless device. The method 820 further includes, at block 832, receiving, by the wireless device, the second frame immediately subsequent to receiving the first frame. The method 820 further include, at block 836, refraining, by the wireless device, from decoding at least a part of a payload of the second frame based at least in part on the determining at block 832.

Figure 8C:
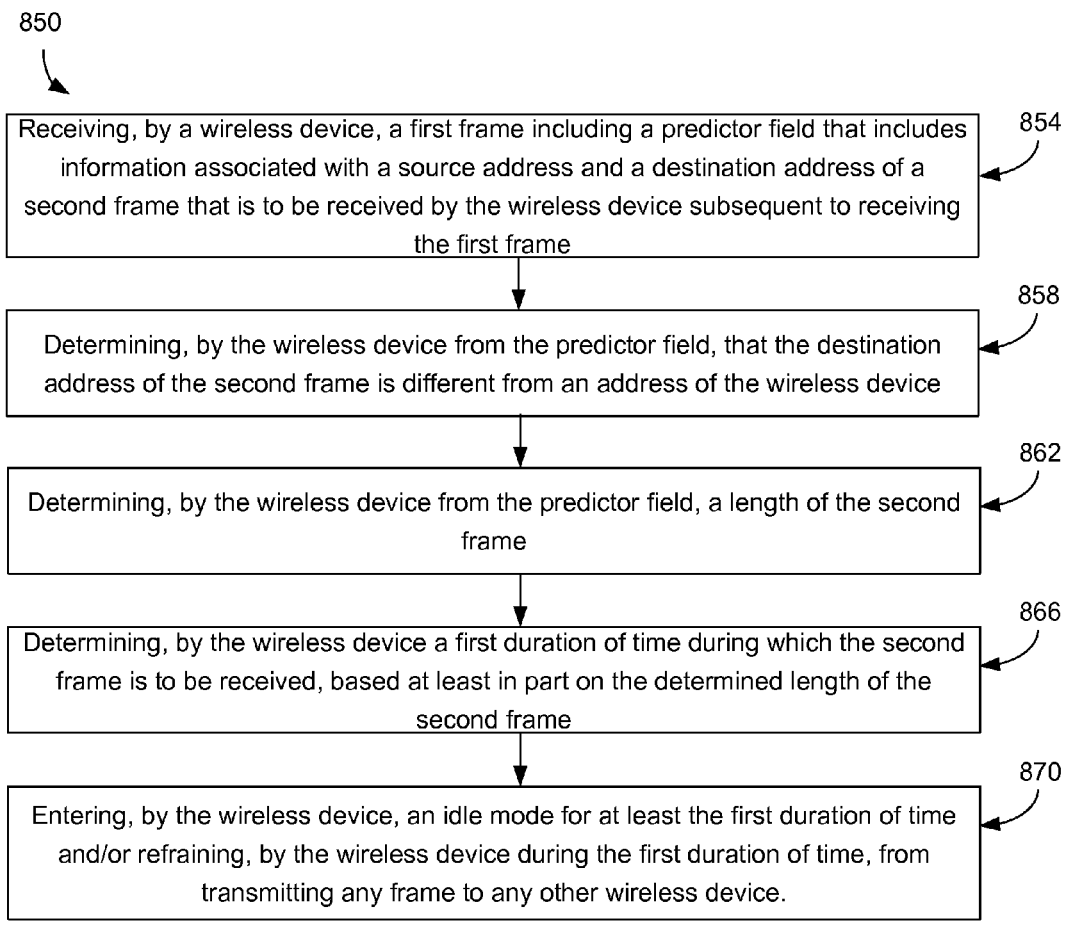

FIG. 8*c* illustrates an exemplary method 850 for receiving a frame that includes a predictor field. The method 850 includes, at block 854, receiving, by a wireless device (e.g., device 1 of FIG. 1), a first frame (e.g., first frame 580 FIG. 5*a*) including a predictor field (e.g., predictor field 502 of FIG. 5*a*) that includes information associated with a source address and a destination address of a second frame (e.g., second frame 582 FIG. 5*a*) that is to be received by the wireless device subsequent to receiving the first frame. The method 850 further includes, at block 858, determining, by the wireless device from the predictor field, that the destination address of the second frame is different from an address of the wireless device. The method further includes, at block 862, determining, by the wireless device from the predictor field, a length of the second frame. The method 850 further includes, at block 866, determining, by the wireless device a first duration of time during which the second frame is to be received, based at least in part on the determined length of the second frame. The method 850 further includes, at block 870, entering, by the wireless device, an idle mode for at least the first duration of time and/or refraining, by the wireless device during the first duration of time, from transmitting any frame to any other wireless device.

Exemplary Computing System

Figure 9:
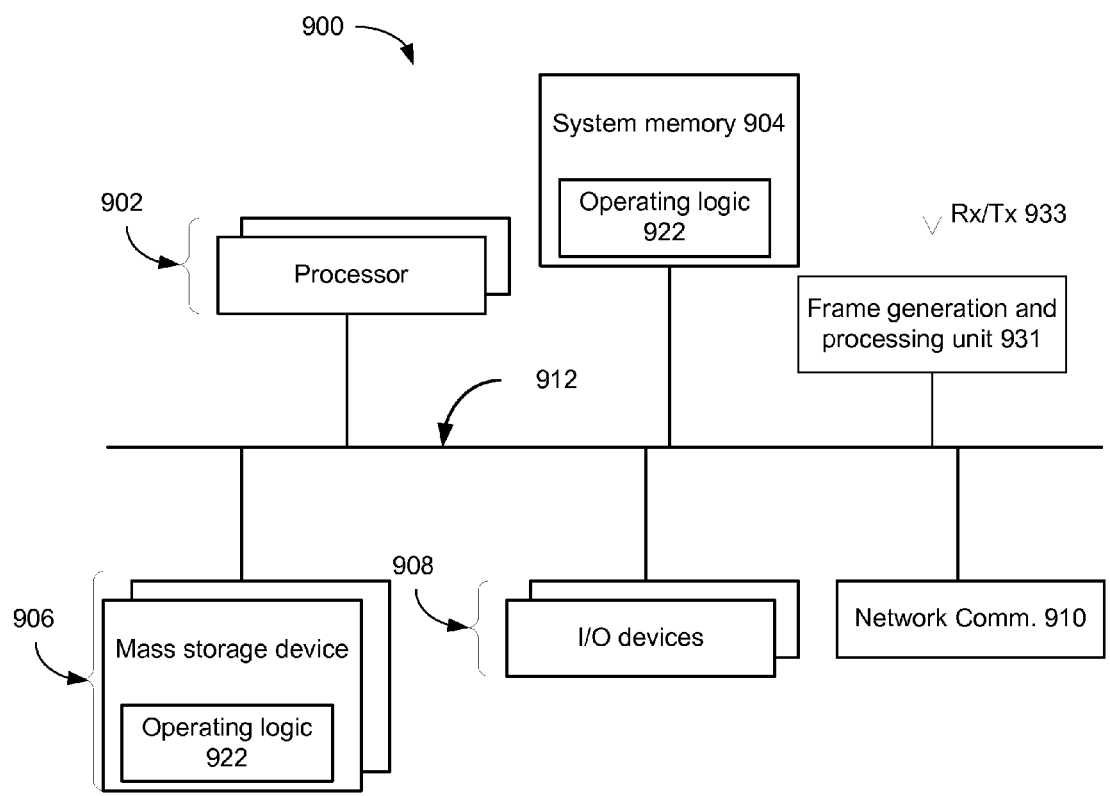
FIG. 9 is a block diagram of an exemplary system.

FIG. 9 is a block diagram of an exemplary system 900. As illustrated, system 900 includes one or more processors or processor cores 902, and system memory 904. For the purpose of this application, including the claims, the terms "processor" and "processor cores" may be considered synonymous, unless the context clearly requires otherwise. Additionally, system 900 includes one or more mass storage devices 906 (such as diskette, hard drive, compact disc read only memory (CDROM) and so forth), input/output devices 908 and communication interfaces 910 (such as network interface cards, modems and so forth). The elements of FIG. 9 are coupled to each other via a system bus 912, which may represent one or more buses. In the case of multiple buses, the multiple buses may be bridged by one or more bus bridges (not illustrated).

Each of these elements performs its conventional functions known in the art. In particular, system memory 904 and mass storage 906 may be employed to store a working copy and a permanent copy of the programming instructions implementing all or a portion of earlier described functions, herein collectively denoted as 922. The instructions 922 may be assembler instructions supported by processor(s) 902 or instructions that can be compiled from high level languages, such as C.

The permanent copy of the programming instructions may be placed into permanent storage 906 in the factory, or in the field, through, for example, a distribution medium (not shown), such as a compact disc (CD), or through communication interface 910 (from a distribution server (not shown)). That is, one or more distribution media having instructions 922 may be employed to distribute the instructions 922 and program various client devices. The constitution of these elements 902-912 are generally well known, and accordingly will not be further described.

The system 900 also includes a trans-receiver 933 (e.g., an antenna) that is coupled to the bus 912 through a frame generation and processing unit 931. The system 900 may be configured to act as a wireless device, similar to one of the devices 1, . . . , 5 of FIG. 1. In one embodiment, the frame generation and processing unit 931 is configured to generate one or more frames, and include a predictor field in each of the frames, as discussed in more detail herein earlier. The frame generation and processing unit 931 may also be configured to process one or more frames received by the antenna 933. The frame generation and processing unit may extract predictor field information from one or more of the received frames, which may be used to process one or more subsequent frames, as discussed in more detail herein earlier. The programming instructions 922 may be used to control one or more activities of the frame generation and processing unit 931.

Although specific embodiments have been illustrated and described herein, a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein.

What is claimed is:

1. An apparatus comprising:
an antenna configured to (i) receive a first data frame, wherein the first data frame includes a field that identifies a parameter associated with a second data frame, and (ii) subsequent to receiving the first data frame, receive the second data frame; and
a processing module configured to (i) process the first data frame to identify the parameter associated with the second data frame, and (ii) based on identifying the parameter associated with the second data frame, process the second data frame,
wherein the first data frame is received from a first device, wherein one or more physical layer settings of the apparatus are used to process the first data frame, and wherein the processing module is further configured to process the second data frame by
based on identifying the parameter associated with the second data frame, determining that the second data frame is to be received from a second device that is different from the first device,
based on determining that the second data frame is to be received from the second device that is different from the first device, resetting the one or more physical layer settings of the apparatus that are used to process the first data frame, and
subsequent to resetting the one or more physical layer settings of the apparatus that are used to process the first data frame, using the one or more physical layer settings of the apparatus to process the second data frame.

2. The apparatus of claim 1, wherein the field included in the first data frame explicitly indicates the parameter associated with the second data frame.

3. The apparatus of claim 1, wherein:
the parameter associated with the second data frame indicates that the second data frame is to be received from the second device.

4. The apparatus of claim 1, wherein:
the apparatus is configured to receive a series of data frames; and
the first data frame and the second data frames are two consecutive data frames of the series of data frames.

5. The apparatus of claim 1, wherein:
the parameter associated with the second data frame indicates whether the apparatus is an intended recipient of the second data frame.

6. The apparatus of claim 1, wherein:
the parameter associated with the second data frame indicates a length of the second data frame.

7. The apparatus of claim 1, wherein the processing module is further configured to process the second data frame by:
based on identifying the parameter associated with the second data frame, determining that the second data frame is intended for the apparatus; and
based on determining that the second data frame is intended for the apparatus, processing the second data frame.

8. The apparatus of claim 1, wherein the apparatus is an access point.

9. The apparatus of claim 1, wherein:
the field in the first data frame has one or more bits;
a first value of the one or more bits in the field in the first data frame indicates a first value of the parameter associated with the second data frame; and
a second value of the one or more bits in the field in the first data frame indicates a second value of the parameter associated with the second data frame.

10. The apparatus of claim 1, wherein the field in the first data frame is a predictor field.

11. A method for receiving and processing data frames, the method comprising:
receiving a first data frame, wherein the first data frame includes a field that explicitly indicates a parameter associated with a second data frame that is to be received subsequent to receiving the first data frame;
processing the first data frame to identify the parameter associated with the second data frame;
subsequent to receiving the first data frame, receiving the second data frame; and
based on identifying the parameter associated with the second data frame, processing the second data frame, wherein the first data frame is received from a first device, wherein the first data frame and the second data frame are received by an apparatus, wherein one or more physical layer settings of the apparatus are used to process the first data frame, and wherein processing the second data frame further comprises
based on identifying the parameter associated with the second data frame, determining that the second data frame is to be received from a second device that is different from the first device,
based on determining that the second data frame is to be received from the second device that is different from the first device, resetting the one or more physical layer settings of the apparatus that are used to process the first data frame, and
subsequent to resetting the one or more physical layer settings of the apparatus that are used to process the first data frame, using the one or more physical layer settings of the apparatus to process the second data frame.

12. The method of claim 11, wherein
the parameter associated with the second data frame indicates that the second data frame is to be received from the second device.

13. The method of claim 11, further comprising:
receiving a series of data frames, wherein the first data frame and the second data frames are two consecutive data frames of the series of data frames.

14. The method of claim 11, wherein:
the parameter associated with the second data frame indicates whether the apparatus is an intended recipient of the second data frame.

15. The method of claim 11, wherein:
the parameter associated with the second data frame indicates a length of the second data frame.

16. The method of claim 11, wherein processing the second data frame comprises:
based on identifying the parameter associated with the second data frame, determining that the second data frame is intended for the apparatus; and
based on determining that the second data frame is intended for the apparatus, processing the second data frame.

17. The method of claim 11, wherein processing the second data frame further comprises:
based on identifying the parameter associated with the second data frame, determining that the apparatus is not an intended recipient of the second data frame; and based on determining that the apparatus is not an intended recipient of the second data frame, refraining from decoding at least a part of a payload of the second data frame.

18. The method of claim 11, wherein:
the apparatus is an access point.

19. The method of claim 11, wherein:
the field in the first data frame has one or more bits;
a first value of the one or more bits in the field in the first data frame indicates a first value of the parameter associated with the second data frame; and
a second value of the one or more bits in the field in the first data frame indicates a second value of the parameter associated with the second data frame.

20. The method of claim 11, wherein the field in the first data frame is a predictor field.

* * * * *